United States Patent
Chiu

(10) Patent No.: US 9,684,319 B2
(45) Date of Patent: Jun. 20, 2017

(54) HEATING CIRCUIT, ELECTRONIC APPARATUS, AND METHOD FOR ENTERING OPERATION MODE IN LOW-TEMPERATURE ENVIRONMENT

(75) Inventor: Chia-Chang Chiu, New Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 700 days.

(21) Appl. No.: 13/290,013

(22) Filed: Nov. 4, 2011

(65) Prior Publication Data

US 2012/0168417 A1 Jul. 5, 2012

Related U.S. Application Data

(60) Provisional application No. 61/429,739, filed on Jan. 4, 2011.

(30) Foreign Application Priority Data

Mar. 15, 2011 (CN) .......................... 2011 1 0072145

(51) Int. Cl.
*G05D 23/19* (2006.01)
*G11B 33/14* (2006.01)

(52) U.S. Cl.
CPC ....... *G05D 23/1932* (2013.01); *G11B 33/144* (2013.01)

(58) Field of Classification Search
CPC .................................................. G05D 23/1932
USPC ....... 219/486, 487, 489, 490, 491, 494, 507, 219/508, 510, 511; 374/141; 713/2, 300; 702/132
See application file for complete search history.

(56) References Cited

U.S. PATENT DOCUMENTS 3,725,768 A 4/1973 Pelly
5,105,067 A * 4/1992 Brekkestran et al. ........ 219/497
5,640,171 A * 6/1997 Shimada ........................... 345/8
(Continued)

FOREIGN PATENT DOCUMENTS

CN 1782945 A 6/2006
CN 101818714 A 9/2010
(Continued)

OTHER PUBLICATIONS

Translation of DE 102008043866.*

*Primary Examiner* — David Angwin
*Assistant Examiner* — Frederick Calvetti

(57) ABSTRACT

A method for entering an operation mode in a low-temperature environment is applicable in a situation that plural electronic devices in an electronic apparatus are not activated. Through performing the method, the electronic apparatus obtains a temperature of each electronic device after receiving a request of a user. Then the electronic apparatus determines whether the temperatures of all the electronic devices reach a threshold value. If the temperatures of at least two electronic devices do not reach the threshold value, the electronic apparatus generates a plurality of corresponding enable signals for the electronic devices having the temperatures lower than the threshold value. The waveforms of the enable signals vary alternately. The electronic apparatus transfers the enable signals to a plurality of corresponding heaters. Being activated by the received enable signal, each of the heaters heats the corresponding electronic device.

17 Claims, 7 Drawing Sheets

(56) References Cited

U.S. PATENT DOCUMENTS

| | | | |
|---|---|---|---|
| 6,009,369 A * | 12/1999 | Boisvert et al. | 701/99 |
| 6,093,916 A * | 7/2000 | Toyoizumi | 219/501 |
| 6,127,660 A * | 10/2000 | Scafati | 219/486 |
| 6,169,930 B1 * | 1/2001 | Blachek et al. | 700/79 |
| 6,169,932 B1 * | 1/2001 | Nunes | 700/117 |
| 6,212,644 B1 * | 4/2001 | Shimoda et al. | 713/324 |
| 6,580,059 B1 * | 6/2003 | Kanno | 219/486 |
| 6,608,728 B1 * | 8/2003 | Sugiyama | 360/66 |
| 6,735,035 B1 * | 5/2004 | Smith et al. | 360/69 |
| 6,867,939 B2 * | 3/2005 | Katahara et al. | 360/53 |
| 7,333,283 B2 * | 2/2008 | Akamatsu et al. | 360/69 |
| 7,502,190 B2 * | 3/2009 | Yoshida | 360/69 |
| 7,523,338 B2 * | 4/2009 | Fu et al. | 713/340 |
| 7,609,473 B1 * | 10/2009 | Mate | 360/75 |
| 7,706,929 B2 * | 4/2010 | Chiu | 700/300 |
| 8,095,332 B2 * | 1/2012 | Hsieh | 702/132 |
| 8,176,308 B2 * | 5/2012 | Chiu | 713/2 |
| 8,200,993 B2 * | 6/2012 | Chiu | 713/300 |
| 8,251,580 B2 * | 8/2012 | Chiu | 374/141 |
| 8,583,344 B2 * | 11/2013 | Cassani | 701/102 |
| 2003/0088799 A1 * | 5/2003 | Bodas | 713/320 |
| 2003/0121905 A1 * | 7/2003 | Nanno et al. | 219/494 |
| 2004/0228023 A1 * | 11/2004 | Keller | G11B 27/36 360/69 |
| 2005/0092727 A1 * | 5/2005 | Fraley et al. | 219/209 |
| 2005/0216221 A1 * | 9/2005 | Broyles et al. | 702/132 |
| 2005/0268134 A1 * | 12/2005 | Park | 713/324 |
| 2005/0270679 A1 * | 12/2005 | Victor et al. | 360/69 |
| 2007/0165322 A1 * | 7/2007 | Strom et al. | 360/69 |
| 2007/0219644 A1 * | 9/2007 | Sonobe | 700/12 |
| 2007/0222295 A1 | 9/2007 | Wareham et al. | |
| 2007/0272678 A1 * | 11/2007 | Meyuchas et al. | 219/494 |
| 2008/0030893 A1 * | 2/2008 | Yamagata | F16C 17/243 360/97.12 |
| 2008/0070746 A1 * | 3/2008 | Shiomi | F16H 61/66259 477/43 |
| 2008/0094741 A1 * | 4/2008 | Yoshida | 360/31 |
| 2008/0294295 A1 * | 11/2008 | Chiu | G05D 23/1919 700/299 |
| 2009/0163079 A1 * | 6/2009 | Nguyen | 439/607.41 |
| 2010/0061011 A1 * | 3/2010 | Hsien | 360/97.02 |
| 2010/0070745 A1 * | 3/2010 | Chiu | 713/2 |
| 2010/0070746 A1 * | 3/2010 | Chiu | 713/2 |
| 2010/0110583 A1 * | 5/2010 | Chiu | 360/97.02 |
| 2010/0208382 A1 * | 8/2010 | Sakabe | 360/69 |

FOREIGN PATENT DOCUMENTS

| | | |
|---|---|---|
| DE | 102008043866 A1 | 5/2010 |
| EP | 1291741 A1 | 3/2003 |
| EP | 2224124 * | 9/2010 |
| TW | 144401 | 10/1990 |
| TW | 502557 | 9/2002 |
| TW | M341238 | 9/2008 |

\* cited by examiner

HEATING CIRCUIT, ELECTRONIC APPARATUS, AND METHOD FOR ENTERING OPERATION MODE IN LOW-TEMPERATURE ENVIRONMENT

CROSS-REFERENCES TO RELATED APPLICATIONS

This non-provisional application claims priority under 35 U.S.C. §119(e) on U.S. Provisional Application 61/429,739 filed on Jan. 4, 2011 and priority under 35 U.S.C. §119(a) on Patent Application No. 201110072145.9 filed in China on Mar. 15, 2011, the entire contents of which are hereby incorporated by reference.

BACKGROUND OF THE INVENTION

Technical Field

The present invention relates to operate an electronic device in a low-temperature environment, and more particularly, to a heating circuit, an electronic apparatus, and a method for entering an operation mode in a low-temperature environment.

Related Art

In a low-temperature environment, for example, an environment at a temperature lower than −20° C., a part of electronic components in an electronic apparatus cannot operate normally, and even be damaged in operation. Especially for a fluid dynamic bearing in a common hard disk driver, in the low-temperature environment, a viscous liquid film in the fluid dynamic bearing is likely to be solidified. When the viscous liquid film in the fluid dynamic bearings is solidified, if the disk of the hard disk driver rotates, the disk may be damaged, and data stored in the hard disk driver is damaged.

A rugged electronic apparatus, such as a rugged laptop computer, has one or more built-in heaters for heating the hard disk driver or the battery in the rugged electronic apparatus. The purpose of heating the hard disk driver or the battery is to maintain the viscous liquid film or the electrolyte in the fluid dynamic bearing in a liquid state without being solidified. Before booting up, such an electronic apparatus allows the user to turn on the heaters manually, so as to heat the aforementioned electronic components and then switch the electronic apparatus to boot up after a period of heating.

Theoretically speaking, heating the hard disk drivers by multiple heaters simultaneously, the electronic apparatus can boot up as soon as possible. In fact, the average electric power obtained by each heater from the power supplier is reduced when the number of the heaters is increased; therefore, a heating efficiency of each hard disk driver is reduced.

SUMMARY

The present invention is directed to a heating circuit for hard disk drivers, an electronic apparatus, and a method for entering an operation mode in a low-temperature environment, to solve the problems mentioned above.

The present invention provides a heating circuit, applicable in a situation that plural electronic devices are not activated. The heating circuit includes a plurality of thermal sensors, a controller, and a plurality of heaters. The thermal sensors are provided for respectively detecting a temperature of each electronic device. The controller is provided for obtaining the temperatures of all the electronic devices through the thermal sensors, determining whether the temperatures of all the electronic devices reach a threshold value, and generating a plurality of enable signals when the temperatures of at least two electronic devices are lower than the threshold value. The waveforms of the enable signals vary alternately. The heaters are provided for respectively receiving one of the enable signals, and heating at least one of the electronic devices according to the received enable signal.

The present invention also provides an electronic apparatus, which includes a processor, plural electronic devices, a plurality of thermal sensors, a controller, and a plurality of heaters. The thermal sensors are provided for respectively detecting a temperature of each electronic device. The controller is provided for obtaining the temperatures of all the electronic devices through the thermal sensors. Before the electronic devices are activated, the controller determines whether the temperatures of all the electronic devices reach a threshold value, and generates a plurality of enable signals when the temperatures of at least two electronic devices are lower than the threshold value. The waveforms of the enable signals vary alternately. The heaters are provided for respectively receiving the enable signals, and heating at least one of the electronic devices according to the received enable signal.

The present invention further provides a method for entering an operation mode in a low-temperature environment, applicable in a situation that plural electronic devices in an electronic apparatus are not activated. By performing the method, an electronic apparatus obtains a temperature of each electronic device after receiving a request of a user, wherein the request includes an event of requiring the electronic apparatus to enter the operation mode.

Then, the electronic apparatus determines whether the temperatures of all the electronic devices reach a threshold value. If the temperatures of at least two electronic devices do not reach the threshold value, the electronic apparatus generates a plurality of enable signals corresponding to the electronic devices having the temperature lower than the threshold value, wherein waveforms of the enable signals vary alternately. Then the electronic apparatus transfers the enable signals to the corresponding heaters, in which each enable signal is transferred to at least one of the heaters, so as to heat one of the electronic devices by each heater according to the received enable signal.

BRIEF DESCRIPTION OF THE DRAWINGS

The present invention will become more fully understood from the detailed description given herein below for illustration only, and thus are not limitative of the present invention, and wherein.

DETAILED DESCRIPTION

Figure 1:
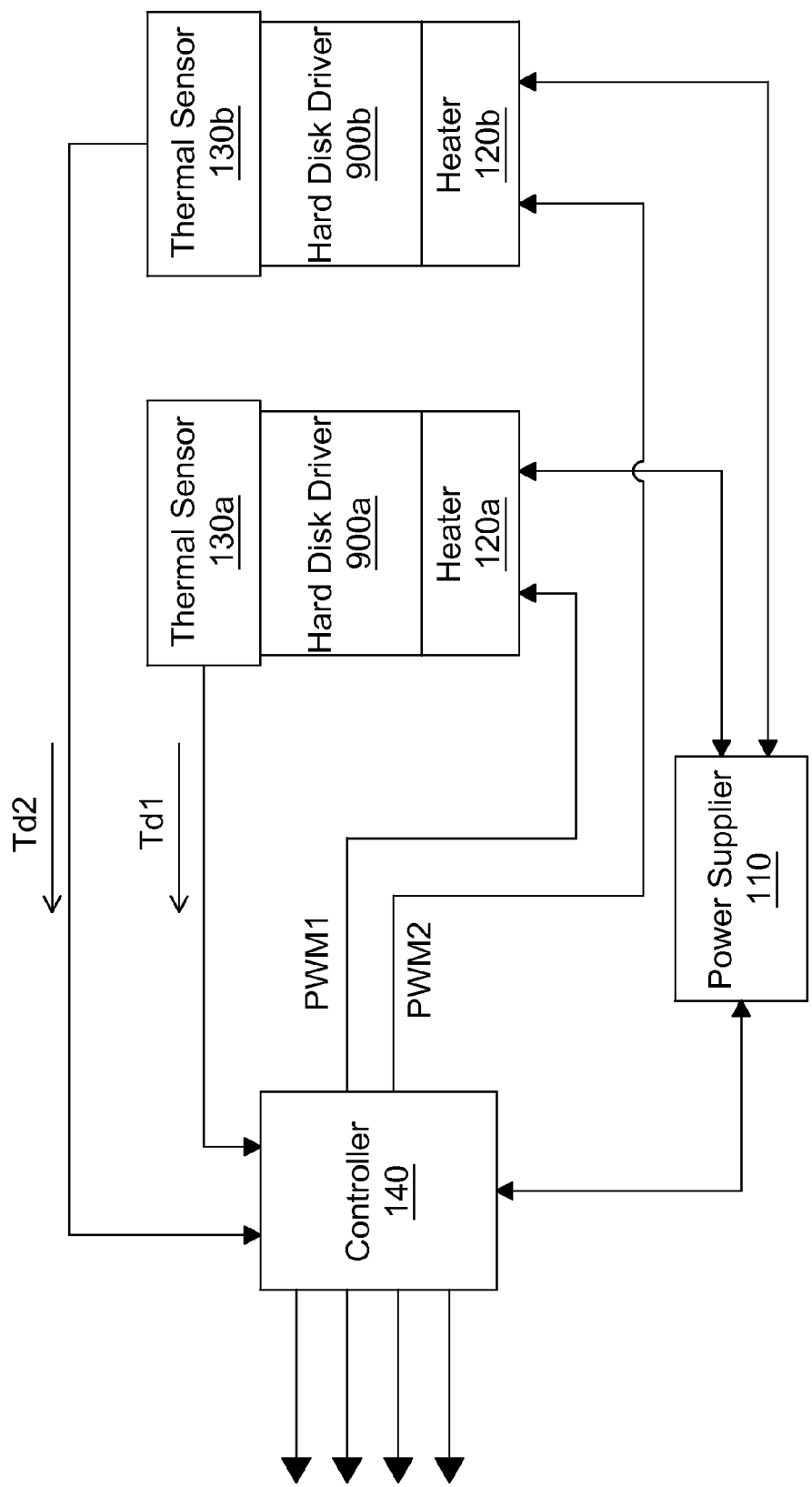
FIG. 1 is a block diagram of a heating circuit according to a first embodiment of the present invention.

Referring to FIG. 1, a heating circuit according to a first embodiment of the present invention illustrated. The heating circuit is applicable in a situation that plural electronic devices are not activated. The heating circuit obtains a power from a power supplier 110 to heat the plurality of electronic devices. In this embodiment, the electronic devices include two hard disk drivers 900a, 900b, in which each hard disk driver 900a, 900b has a fluid dynamic bearing (not illustrated in the drawings). The heating circuit includes two heaters 120a, 120b, two thermal sensors 130a, 130b, and a controller 140.

As illustrated in FIG. 1, the power supplier 110 is for converting the voltage output of a source to a specific voltage and then output the specific voltage. Taking an IBM PC compatible computer as an example, the power provided by the power supplier 110 is a direct current (DC), and a voltage of the DC is usually continuous DC of 12 V and 5 V.

As illustrated in FIG. 1, the two heaters 120a, 120b are respectively disposed on the hard disk drivers 900a, 900b for respectively heating the hard disk drivers 900a, 900b, such that each hard disk driver 900a, 900b can be heated by at least one of the heaters 120a/120b. In this embodiment, only one heater 120a/120b is disposed on each hard disk driver 900a/900b. In fact, plural heaters may be disposed on one single hard disk driver 900a/900b, to improve a heating effect of the single hard disk driver 900a/900b.

As illustrated in FIG. 1, the thermal sensors 130a, 130b are respectively disposed on the hard disk drivers 900a, 900b for respectively detect temperatures of the hard disk drivers 900a, 900b, so to obtain the temperatures Td1, Td2 of the hard disk drivers 900a, 900b. Furthermore, the thermal sensors 130a, 130b and the hard disk drivers 900a, 900b are respectively supplied with the power, such that when the thermal sensors 130a, 130b are activated, the hard disk drivers 900a, 900b need not to be activated simultaneously.

As illustrated in FIG. 1, an example of the controller 140 is an embedded controller (EC) or a keyboard controller of a computer, and the controller 140 executes a program code, such that the controller 140 can receive the temperatures Td1, Td2 detected by the thermal sensors 130a, 130b, and a threshold value Tth is set in the controller 140.

The controller 140 obtains the temperatures Td1, Td2 of the hard disk drivers through the thermal sensors 130a, 130b, and determines whether both the temperatures Td1, Td2 of the hard disk drivers reach a threshold value Tth.

When both the temperatures Td1, Td2 of the hard disk drivers 900a, 900b are lower than the threshold value Tth, the controller 140 respectively transfers a first enable signal PWM1 and a second enable signal PWM2 to the corresponding first heater 120a and the corresponding second heater 120b. Then, the first heater 120a and the second heater 120b respectively heat the hard disk driver 900a, 900b according to the first enable signal PWM1 and the second enable signal PWM2.

The first heater 120a heats the hard disk driver 900a when the first enable signal PWM1 is at a high-voltage level, and stops heating the hard disk driver 900a when the first enable signal PWM1 is at a low-voltage level. Similar to the heating mode of the first heater 120a, the second heater 120b heats the hard disk driver 900b when the second enable signal PWM2 is at the high-voltage level, and stops heating the hard disk driver 900b when the second enable signal PWM2 is at the low-voltage level.

Figure 2A:
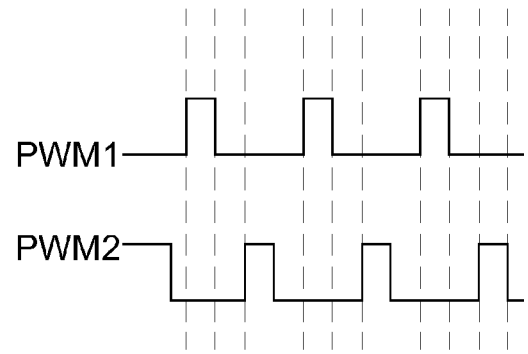
FIGS. 2A, 2B, and 2C are waveform charts I, II, and III of enable signals according to the first embodiment of the present invention.
Figure 2B:
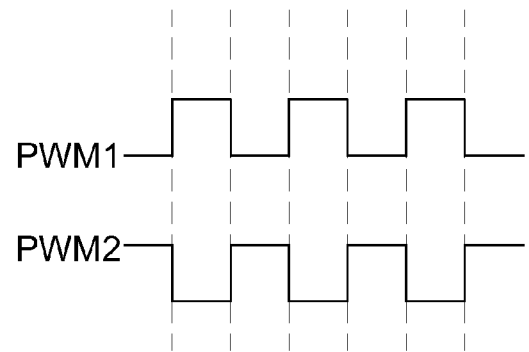
Figure 2C:
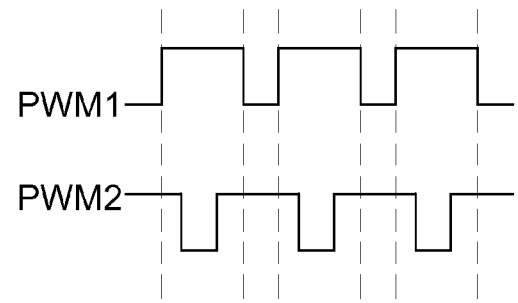

The first enable signal PWM1 and the second enable signal PWM2 can be pulse width modulation (PWM) signals, and the waveforms of the enable signals vary alternately. As illustrated in FIG. 2A, the waveforms of the first enable signal PWM1 and the second enable signal PWM2 are totally non-overlapped. As illustrated in FIG. 2B, the waveforms of the first enable signal PWM1 and the second enable signal PWM2 are alternately switched. As illustrated in FIG. 2C, the waveforms of the first enable signal PWM1 and the second enable signal PWM2 are partially overlapped.

In this manner, an overload situation of the power supplier 110 caused by heating the hard disk drivers 900a, 900b by the heaters 120a, 120b simultaneously and continuously is prevented. If the waveforms of the first enable signal PWM1 and the second enable signal PWM2 are totally non-overlapped, and an instantaneous electrical power output to the heaters 120a, 120b by the power supplier 110 is close to, but does not exceeds, a maximal load of the power supplier 110.

Figure 3:
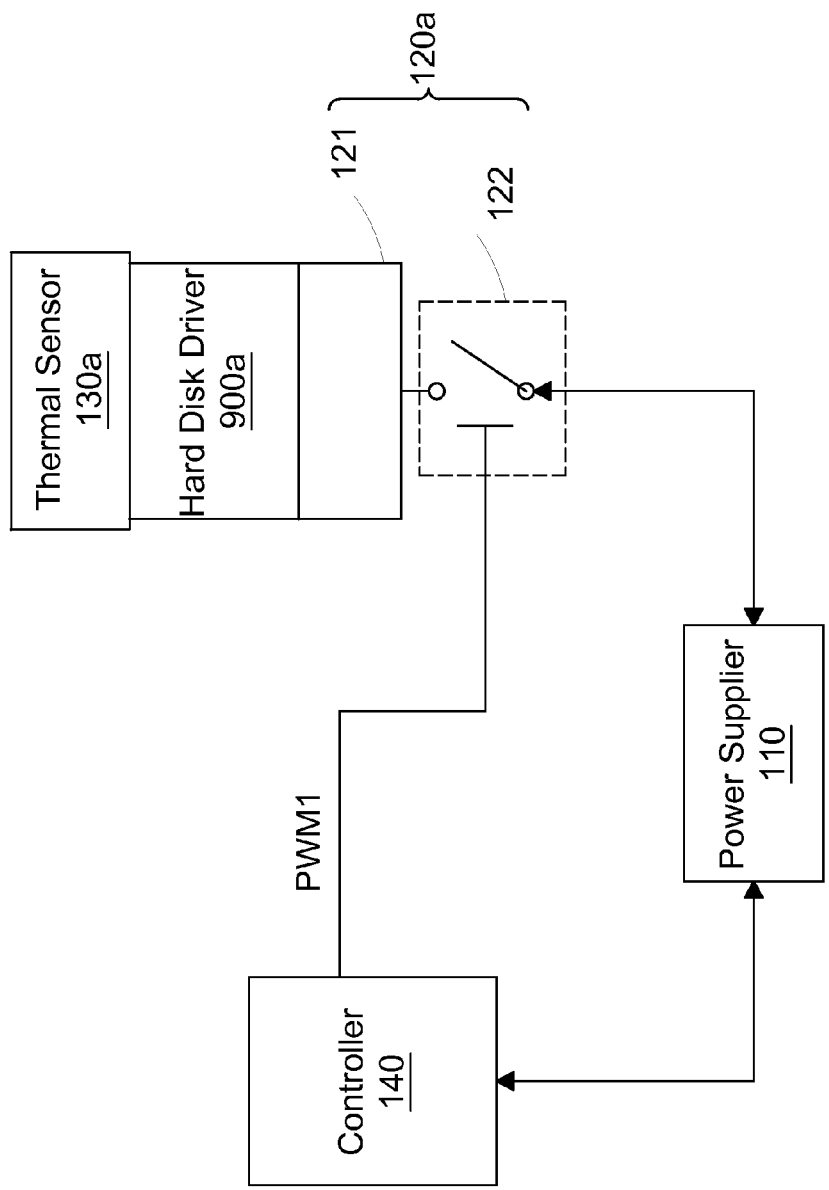
FIG. 3 is a circuit diagram of the heater according to the first embodiment of the present invention.

Referring to FIG. 3, a structure of the first heater 120a is illustrated. The first heater 120a at least includes a thermoelectric element 121 and a switch 122. When the first enable signal PWM1 is at the high-voltage level, the first heater 120a turns on the switch 122, to enable the thermoelectric element 121 to heat the hard disk driver 900a. When the first enable signal PWM1 is at the low-voltage level, the first heater 120a turns off the switch 122, to enable the thermoelectric element 121 to stop heating the hard disk driver 900a. In the same manner of the first heater 120a, the second heater 120b can also control whether to heat the hard disk driver 900b according to whether the second enable signal PWM2 is at the high-voltage level or low-voltage level.

Figure 4:
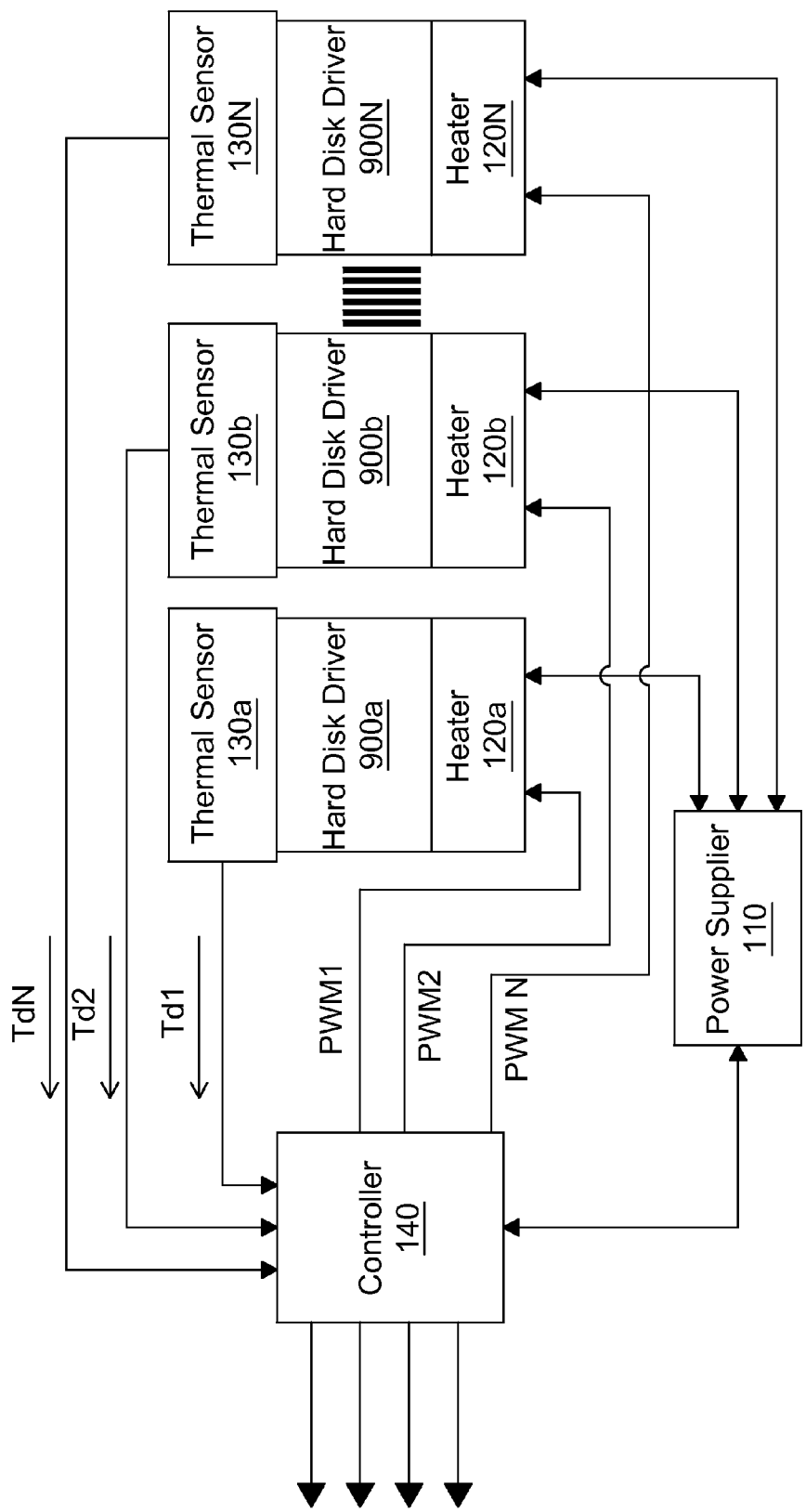
FIG. 4 is a circuit diagram of the heating circuit according to a second embodiment of the present invention.

Referring to FIG. 4, a heating circuit according to a second embodiment of the present invention is illustrated. The heating circuit is applicable in a situation that plural electronic devices are not activated. In this embodiment, the heating circuit is utilized to heat more than two electronic devices. An example is that the electronic devices includes plural hard disk drivers (900a, 900b . . . 900N), and each hard disk driver (900a, 900b . . . 900N) has a fluid dynamic bearing (not illustrated in the drawing).

In this embodiment, the heating circuit includes a plurality of heaters (120a, 120b . . . , 120N), a plurality of thermal sensors (130a, 130b . . . 130N), and a controller 140. Each thermal sensor (130a, 130b . . . 130N) is provided for respectively detecting the temperature of one single hard disk driver (900a, 900b . . . 900N), to obtain the temperatures (Td1, Td2 . . . TdN) corresponding to the hard disk drivers (900a, 900b . . . 900N). The controller 140 is an EC or a keyboard controller. In this embodiment, the structures and the heating modes of the heaters (120a, 120b . . . 120N) are the same as those of the first heater 120a in the first embodiment.

The controller 140 obtains the temperatures (Td1, Td2, . . . , TdN) of all the hard disk drivers (900a, 900b, . . . , 900N) through the thermal sensors (130a, 130b, . . . , 130N), and determines whether the temperatures (Td1, Td2 . . . TdN) of the hard disk drivers reach a threshold value Tth.

When at least two of the temperatures (Td1, Td2, . . . , TdN) of the hard disk drivers are lower than the threshold value Tth, for example, Td1 and Td2 among the temperatures (Td1, Td2, . . . , TdN) are lower than the threshold value Tth, the controller 140 generates corresponding enable signals (PWM1, PWM2) according to the temperatures (Td1, Td2) lower than the threshold value Tth. The waveforms of the enable signals PWM1, PWM2 vary alternately. Then, the enable signals PWM1, PWM2 are transferred to the corresponding heaters 120*a*, 120*b*, so as to heat the hard disk drivers 900*a*, 900*b* having the temperatures Td1, Td2 lower than the threshold value Tth. The enable signal (PWM1/PWM2 . . . /PWM N) is a PWM signal, and the waveforms of the enable signals are totally non-overlapped, alternately switched, or partially overlapped.

In this embodiment, the controller 140 only generates the plurality of enable signals (PWM1, PWM2, . . . , PWM N) for heating the electronic devices having the temperatures (Td1, Td2, . . . , TdN) lower than the threshold value Tth, when the temperatures (Td1, Td2, . . . , TdN) of at least two electronic devices are lower than the threshold value Tth. In practice, the controller 140 can also generate other enable signals (PWM1, PWM2, . . . , PMW N) for heating the other electronic devices having the temperatures (Td1, Td2, . . . , TdN) higher than or equal to the threshold value Tth.

Furthermore, each enable signal (PWM1/PWM2/ . . . /PMW N) is transferred to at least one heater (130*a*/130*b*/ . . . /130N). For example, when only a signal heater (130*a*/130*b*/ . . . /130N) is disposed on each hard disk driver (900*a*/900*b*/ . . . /900N), each enable signals (PWM1/PWM2/ . . . /PMW N) is transferred to one single heater (130*a*/130*b*/ . . . /130N). If plural heaters (130*a*, 130*b* . . . 130N) are disposed on one hard disk driver, one single enable signal (PWM1/PWM2/ . . . /PMW N) is transferred to all the heaters (130*a*, 130*b* . . . 130N) on the same hard disk driver (900*a*/900*b*/ . . . /900N).

Figure 5:
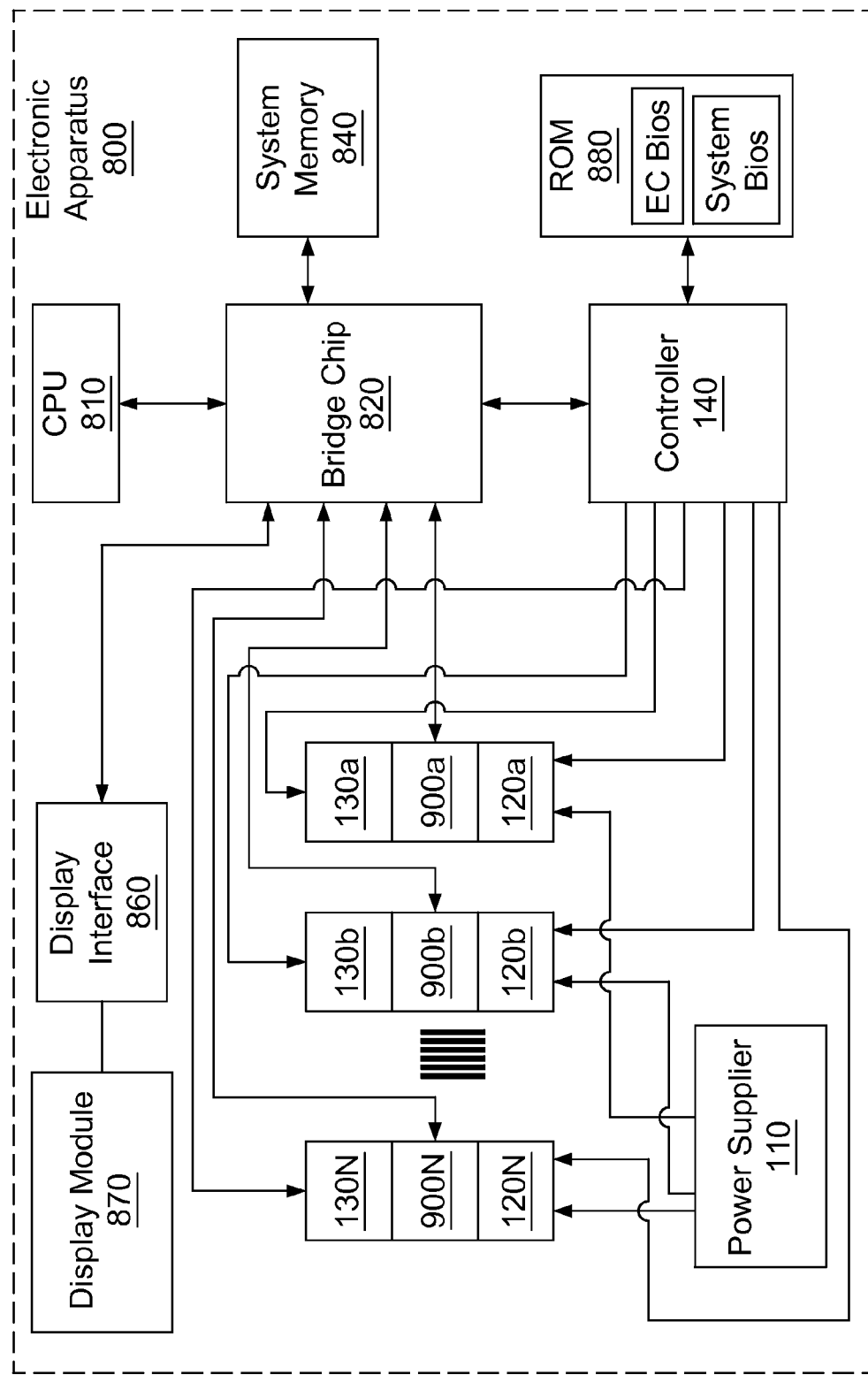
FIG. 5 is a circuit diagram of an electronic apparatus according to a third embodiment of the present invention.
Figure 6:
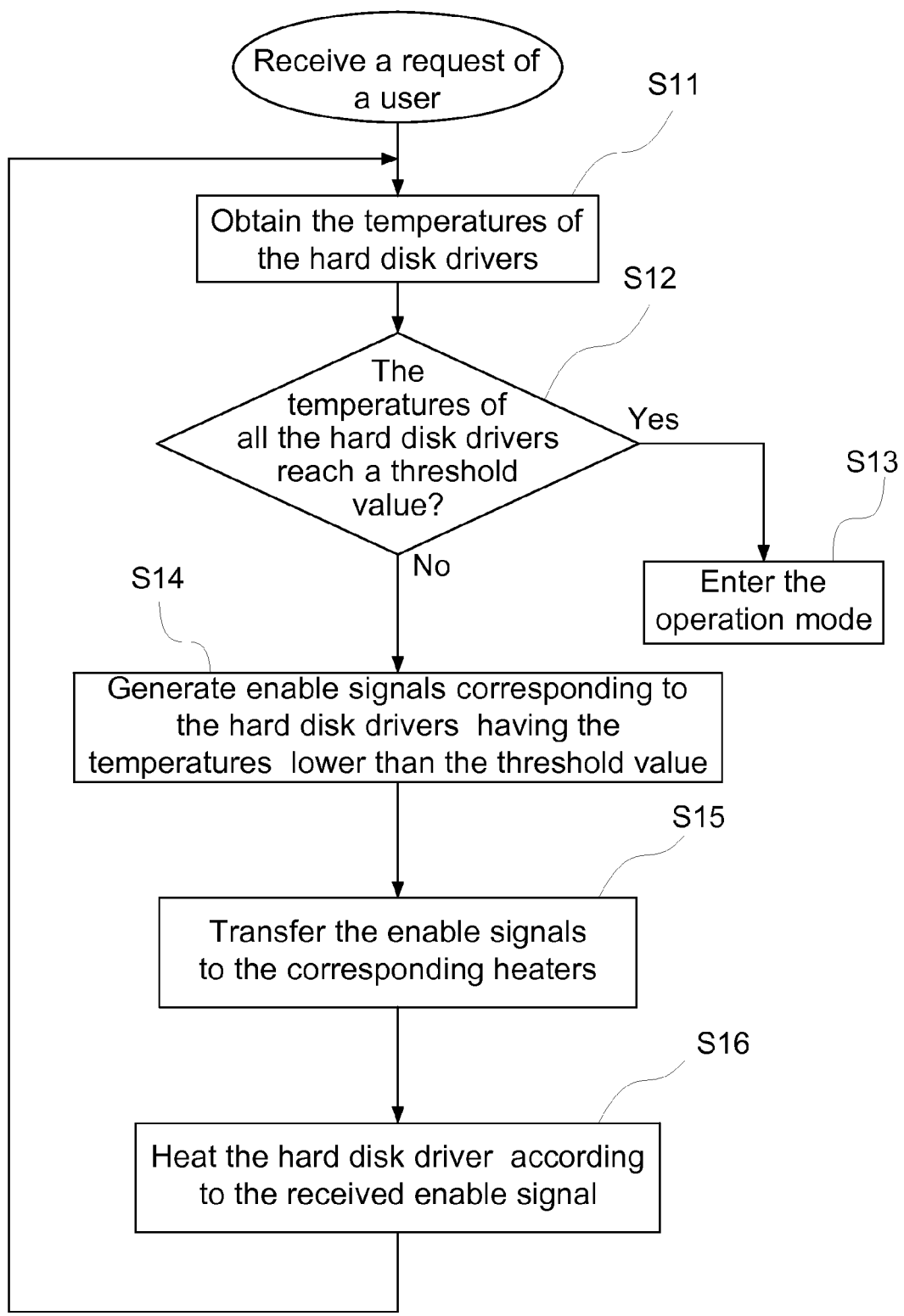
FIG. 6 is a flow chart of a third embodiment of the present invention.

Furthermore, the present invention provides an electronic apparatus 800, which can be a laptop computer, a personal digital assistant (PDA), a portable navigation device (PND), or a tablet computer. As illustrated in FIG. 5, the electronic apparatus 800 in this embodiment is a laptop computer, and is applicable in a situation that plural electronic devices are not activated. Referring to FIG. 6 in combination, FIG. 6 illustrates a booting method in a low-temperature environment, which is executed in the electronic apparatus 800 in FIG. 5. In this embodiment, each electronic device includes a hard disk driver 900*a*, 900*b* . . . 900N, and each hard disk driver 900*a*/900*b*/ . . . /900N has a fluid dynamic bearing. A controller 140 can be a keyboard controller or an EC. The architecture of this embodiment is substantially the same as that of the second embodiment, and is characterized by combining the heating circuit into the electronic apparatus 800.

The electronic apparatus 800 includes a heating circuit, a power supplier 110, a controller 140, a central processing unit (CPU) 810, a bridge chip 820, a system memory 840, a plurality of hard disk drivers 900*a*, 900*b* . . . 900N, a display interface 860, a display module 870, and a read only memory (ROM) 880. The heating circuit includes a plurality of heaters (120*a*, 120*b* . . . , 120N), and a plurality of thermal sensors (130*a*, 130*b* . . . 130N). The controller 140 is an EC or a keyboard controller. As the elements are substantially the same as those in a common laptop computer, only different elements are described hereafter.

First, in the situation that the electronic devices are not activated, the electronic apparatus is in a shutdown mode (S5), a dormant mode (S4), or a sleep mode (S3) of an Advanced Configuration and Power Interface (ACPI).

After the electronic apparatus 800 receives a request of a user, the controller 140 obtains the temperatures (Td1, Td2, . . . , TdN) of the hard disk drivers (900*a*, 900*b*, . . . , 900N) through the thermal sensors (130*a*, 130*b*, . . . , 130N) (S11). The request of the user includes an event of requiring the electronic apparatus 800 to enter an operation mode (for example, an operation mode (S0/G0) of the ACPI). The event of the present invention may be an event generated by software or firmware or a signal generated by hardware.

After obtaining the temperatures (Td1, Td2, . . . , TdN) of all the hard disk drivers (900*a*, 900*b*, . . . , 900N) through the thermal sensors (130*a*, 130*b*, . . . , 130N), the controller 140 determines whether the temperatures of all the hard disk drivers reach a threshold value (S12).

If the controller 140 determines that the temperatures (Td1, Td2 . . . TdN) of all the hard disk drivers 900*a*, 900*b* . . . , and 900N reach the threshold value Tth, the controller 140 enables the electronic apparatus 800 to enter the operation mode (S13). After the electronic apparatus 800 enters the operation mode, the hard disk drivers (900*a*, 900*b* . . . 900N) operate normally.

If the controller 140 determines that the temperatures (Td1, Td2, . . . , TdN) of at least two hard disk drivers (900*a*, 900*b*, . . . , 900N) do not reach the threshold value Tth, the controller 140 generates enable signals PWM1/PWM2/ . . . /PWM N corresponding to the hard disk drivers 900*a*/900*b*/ . . . /900N having the temperatures (Td1, Td2, . . . , TdN) lower than the threshold value Tth (S14). The waveforms of the generated enable signals PWM1/PWM2/ . . . /PWM N vary alternately.

In this embodiment, the controller 140 only generates the enable signals PWM1/PWM2/ . . . /PWM N corresponding to the hard disk drivers 900*a*/900*b*/ . . . /900N having the temperatures lower than the threshold value Tth. In practice, the controller 140 can also generate the enable signals PWM1/PWM2/ . . . /PWM N corresponding to the hard disk drivers 900*a*/900*b*/ . . . /900N having the temperatures Td1, Td2 . . . TdN higher than or equal to the threshold value Tth.

The alternately varying waveforms described in this embodiment may be totally non-overlapped waveforms, alternately switched waveforms, or partially overlapped waveforms of the enable signals PWM1/PWM2/ . . . /PWM N.

Figure 7A:
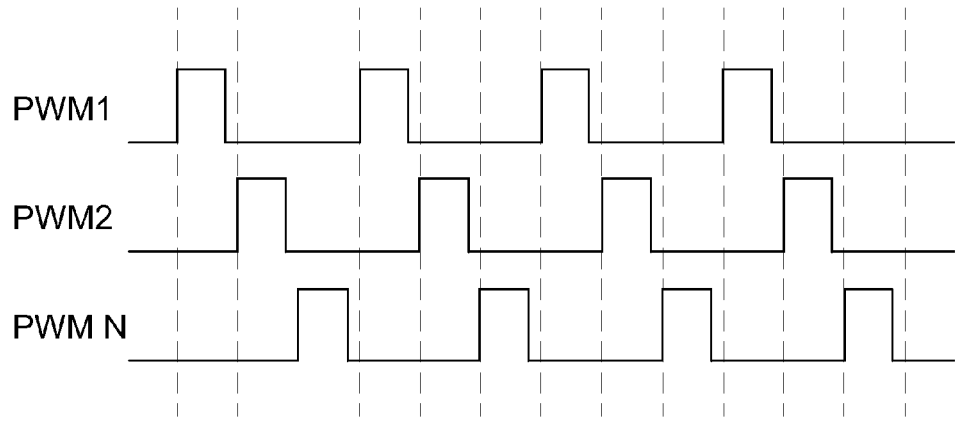
FIGS. 7A, 7B, 7C are waveform charts I, II, and III of enable signals according to the third embodiment of the present invention.
Figure 7B:
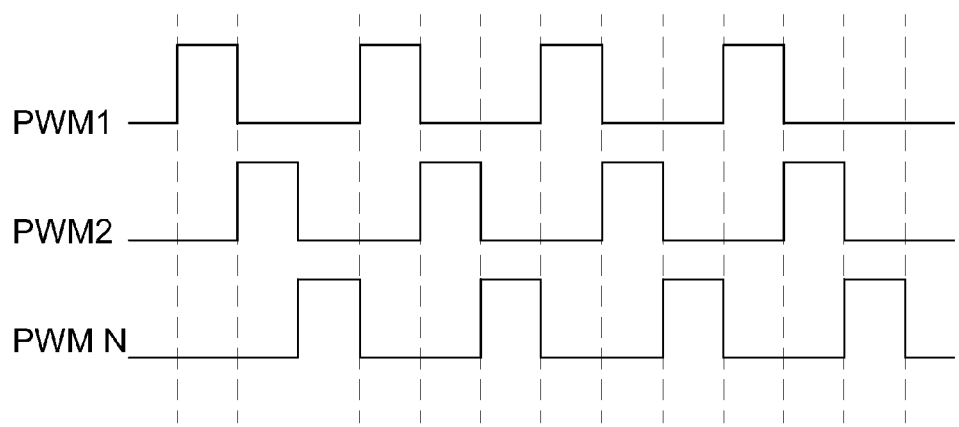
Figure 7C:
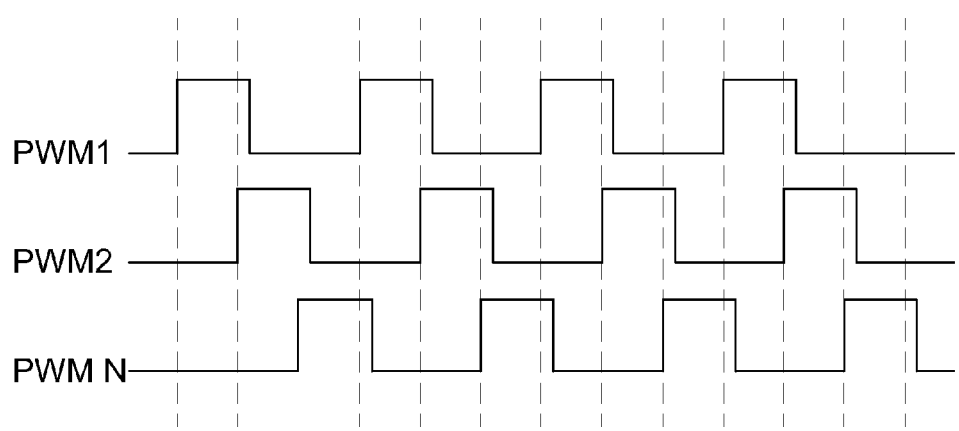

For example, when only Td1, Td2, TdN among the temperatures of all the hard disk drivers obtained by the controller 140 are lower than the threshold value Tth, the controller 140 only generates the enable signals PWM1, PWM2, PWM N. The waveforms of the enable signals PWM1, PWM2, PWM N are totally non-overlapped, as illustrated in FIG. 7A. The waveforms of the enable signals PWM1, PWM2, PWM N are alternately switched, as illustrated in FIG. 7B. The waveforms of the enable signals PWM1, PWM2, PWM N are partially overlapped, as illustrated in FIG. 7C.

Next, the controller 140 transfers the enable signals to the corresponding heaters (S15), in which each enable signal PWM1/PWM2/ . . . /PWM N is transferred to at least one heater 120*a*/120*b*/ . . . /120N. For example, if the controller 140 only generates the enable signals PWM1, PWM2, PWM N, the controller 140 respectively transfers the enable signals PWM1, PWM2, PWM N to the corresponding heaters 120*a*, 120*b*, 120N.

After the heater 120*a*/120*b*/ . . . /120N receives the enable signal PWM1/PWM2/ . . . /PWM N generated by the controller 140, each heater 120*a*/120*b*/ . . . /120N heats the hard disk driver 900*a*/900*b*/ . . . /900N according to the received enable signal PWM1/PWM2/ . . . /PWM N (S16). For example, if only the enable signals PWM1, PWM2, PWM N are transferred to the corresponding heaters 120*a*, 120b, 120N, the heaters 120a, 120b, 120N heat the hard disk drivers 900a, 900b, 900N according to the enable signals PWM1, PWM2, PWM N.

Furthermore, each enable signal PWM1/PWM2/ . . . /PWM N is transferred to at least one heater 120a/ 120b/ . . . /120N. For example, when only one single heater 120a/120b/ . . . /120N is disposed on each hard disk driver 900a/900b/ . . . /900N, on single enable signal PWM1/ PWM2/ . . . /PWM N is only transferred to the single heater 120a/120b/ . . . /120N. If plural heaters 120a/ 120b/ . . . /120N are disposed on one hard disk driver 900a/900b/ . . . /900N, the single enable signal PWM1/ PWM2/ . . . /PWM N is transferred to all the heaters 120a/120b/ . . . /120N on the same hard disk driver 900a/ 900b/ . . . /900N.

After the heater 120a/120b/ . . . /120N heats the hard disk driver 120a/120b/ . . . /120N for a preset time, Steps S11-S16 are repeated. Till the controller 140 determines that the temperatures (Td1, Td2 . . . TdN) of all the hard disk drivers 900a, 900b . . . , 900N reach the threshold value Tth, the controller 140 enables the electronic apparatus 800 to enter the operation mode S0/G0 of the ACPI (S13).

According to the embodiments of the present invention, before the electronic apparatus 800 boots up, the temperatures of the hard disk drivers 900a/900b/ . . . /900N are first confirmed, and after it is confirmed that the temperatures of the hard disk drivers 900a/900b/ . . . /900N exceed the threshold value, the electronic apparatus 800 is enabled to enter the operation mode. Thus, the hard disk drivers 900a/ 900b/ . . . /900N are prevented from operating in a low-temperature state. In this embodiment, the hard disk drivers 900a/900b/ . . . /900N are heated simultaneously, such that at least one enable signal and other enable signals are at least partially non-overlapped, and thus the heaters can achieve an optimal heating efficiency, and an instantaneous total electric power of the heater will not be excessively high.

While the present invention has been described by the way of example and in terms of the preferred embodiments, it is to be understood that the invention need not to be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A heating circuit used in connection with a plurality of electronic devices that are not activated, the heating circuit comprising:
   a plurality of thermal sensors arranged to respectively detect a temperature of a corresponding one of the electronic devices; and
   a plurality of heaters arranged to respectively heat a corresponding one of the electronic devices; and
   a controller programmed to:
      obtain the temperature of each of the electronic devices respectively detected by the thermal sensors;
      determine whether the temperature is lower than a threshold value; and
      generate an enable signal for each heater corresponding to an electronic device having a temperature below the threshold value when the temperature of at least two electronic devices is lower than the threshold value, wherein an enable signal for each of the heaters comprises a continuous waveform generated while the temperature of the at least two electronic devices is lower than the threshold value and comprising an alternating sequence of high and low voltage levels, and wherein for the continuous waveform of a first one of the enable signals, each single low-voltage level begins and ends during a respective single high-voltage level of the continuous waveform of a second one of the enable signals, such that a pulse width of the second one of the enable signals when it reaches the high voltage level is wider than a pulse width of the first one of the enable signals at the low voltage level.

2. The heating circuit as claimed in claim 1, wherein the controller is an embedded controller or a keyboard controller.

3. The heating circuit as claimed in claim 1, wherein each enable signal is a pulse width modulation signal.

4. The heating circuit as claimed in claim 1, wherein the electronic device comprises a hard disk driver, and the hard disk driver has a fluid dynamic bearing.

5. The heating circuit as claimed in claim 1, wherein the controller is programmed to generate the plurality of enable signals only for the electronic devices having the temperatures lower than the threshold value when the temperatures of at least two electronic devices are lower than the threshold value.

6. The heating circuit as claimed in claim 1, wherein each of the enable signals is transferred to at least one heater.

7. An electronic apparatus, comprising:
   a processor and a plurality of electronic devices;
   a plurality of thermal sensors arranged to respectively detect a temperature of a corresponding one of the electronic devices;
   a plurality of heaters arranged to respectively heat a corresponding one of the electronic devices; and
   a controller programmed to:
      obtain the temperature of each of the electronic devices respectively detected by the thermal sensors before the electronic devices are activated;
      determine whether the temperature is lower than a threshold value; and
      generate an enable signal for each heater corresponding to an electronic device having a temperature below the threshold value when the temperature of at least two electronic devices is lower than the threshold value, wherein an enable signal for each of the heaters comprises a continuous waveform generated while the temperature of the at least two electronic devices is lower than the threshold value and comprising an alternating sequence of high and low voltage levels, and wherein for the continuous waveform of a first one of the enable signals, each single low-voltage level begins and ends during a respective single high-voltage level of the continuous waveform of a second one of the enable signals, such that a pulse width of the second one of the enable signals when it reaches the high voltage level is wider than a pulse width of the first one of the enable signals at the low voltage level.

8. The electronic apparatus as claimed in claim 7, wherein the electronic device comprises a hard disk driver, and the hard disk driver has a fluid dynamic bearing.

9. The electronic apparatus as claimed in claim 7, wherein the controller is an embedded controller or a keyboard controller.

10. The electronic apparatus as claimed in claim 7, wherein each of the enable signals is a pulse width modulation signal.

11. The electronic apparatus as claimed in claim 7, wherein the situation that each electronic device is not activated comprises that the electronic apparatus is in a shutdown mode, a dormant mode, or a sleep mode of an Advanced Configuration and Power Interface.

12. The electronic apparatus as claimed in claim 11, wherein after the controller determines that the temperatures of all the electronic devices reach the threshold value, the controller enables the electronic apparatus to enter an operation mode of the Advanced Configuration and Power Interface.

13. A method for entering an operation mode in a low-temperature environment, applicable in a situation when a plurality of electronic devices in an electronic apparatus are not activated, wherein the electronic apparatus comprises a plurality of heaters arranged to respectively heat a corresponding one of the electronic devices, the method comprising:
    after receiving a request, obtaining a temperature of each electronic device, wherein the request comprises an event of requiring the electronic apparatus to enter the operation mode;
    respectively determining whether temperature of each electronic device is lower than a threshold value;
    if the temperatures of at least two electronic devices are lower than the threshold value, generating an enable signal for each heater corresponding to an electronic device having a temperature below the threshold value, wherein an enable signal for each of the heaters comprises a continuous waveform generated while the temperature of the at least two electronic devices is lower than the threshold value and comprising an alternating sequence of high and low voltage levels, and wherein for the continuous waveform of a first one of the enable signals, each single low-voltage level begins and ends during a respective single high-voltage level of the continuous waveform of a second one of the enable signals, such that a pulse width of the second one of the enable signals when it reaches the high voltage level is wider than a pulse width of the first one of the enable signals at the low voltage level;
    respectively transferring the enable signals to the corresponding heaters; and
    respectively heating the electronic device corresponding to each heater receiving the enable signal according to the received enable signal.

14. The method for entering an operation mode in a low-temperature environment as claimed in claim 11, wherein in the situation that the electronic devices are not activated, the electronic apparatus is in a shutdown mode, a dormant mode, or a sleep mode of an Advanced Configuration and Power Interface, and the operation mode is a mode of the Advanced Configuration and Power Interface.

15. The method for entering an operation mode in a low-temperature environment as claimed in claim 11, wherein if the temperatures of all the electronic devices reach the threshold value, the electronic apparatus is enabled to enter the operation mode.

16. The method for entering an operation mode in a low-temperature environment as claimed in claim 13, wherein the enable signal is a pulse width modulation signal.

17. The method for entering an operation mode in a low-temperature environment as claimed in claim 13, further comprising a step of entering the operation mode after all the electronic devices respectively reach the threshold value.

* * * * *